Figure 3:
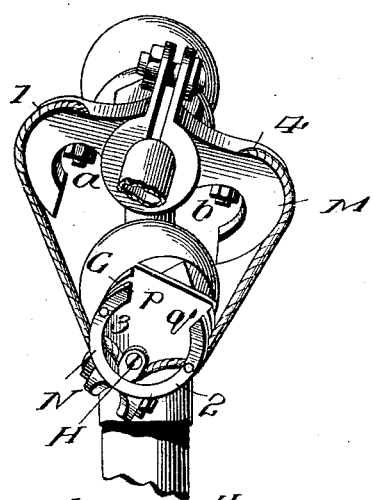

No. 632,099. Patented Aug. 29, 1899.
C. CARLONI.
STEERING MECHANISM.
(Application filed Mar. 16, 1897.)
(No Model.) 2 Sheets—Sheet 1.
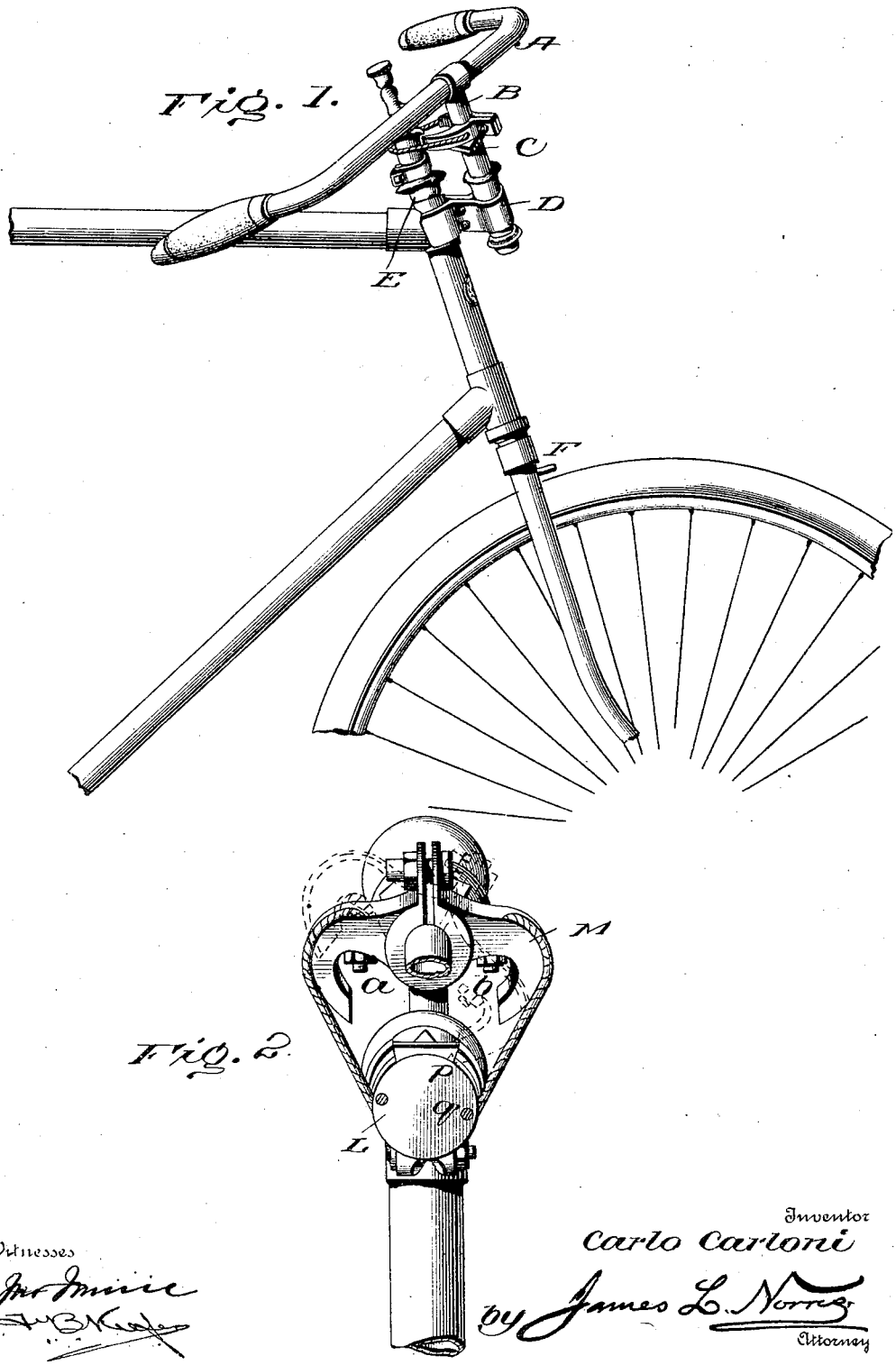
Inventor
Carlo Carloni
by James L. Norris
Attorney
Witnesses No. 632,099. Patented Aug. 29, 1899.
C. CARLONI.
STEERING MECHANISM.
(Application filed Mar. 16, 1897.)

(No Model.) 2 Sheets—Sheet 2.

Witnesses

Inventor
Carlo Carloni
by James L. Norris
Attorney

UNITED STATES PATENT OFFICE.

CARLO CARLONI, OF MILAN, ITALY.

STEERING MECHANISM.

SPECIFICATION forming part of Letters Patent No. 632,099, dated August 29, 1899.

Application filed March 16, 1897. Serial No. 627,869. (No model.)

*To all whom it may concern:*

Be it known that I, CARLO CARLONI, engineer, a subject of the King of Italy, residing at Milan, Italy, have invented Improvements in Steering Mechanism for Velocipedes, of which the following is a specification.

In ordinary velocipedes the steering or handle bar turns around an almost vertical axis through an angle equal to that through which it is desired the front or steering wheel should move when changing the direction. In passing around curves of very small radius the change of direction must take place very abruptly, and the handle-bar will consequently be turned around to a considerable extent and under certain circumstances will occupy a position which is very inconvenient to the cyclist and which will compel him to turn his legs aside, whereby he may easily lose his balance. In the device forming the subject of the present invention the handle-bar is not mounted directly upon the steering-tube, which forms the prolongation of the fork, but upon a steering rod or axis which is parallel and adjacent thereto or even in certain cases upon an axis concentric to the said steering-tube, but always independent of the same. The rotary movement of the handle-bar is transmitted to the steering-tube by means of a mechanism which may be varied indefinitely, but which is in all cases so arranged that the angle through which the handle-bar moves only forms a fraction of the angle through which the fork is required to move. In this manner the extent of oscillation of the handle-bar arms is greatly reduced and the cyclist is not compelled to turn his legs aside in order to effect an abrupt steering motion.

I am aware that it has previously been proposed to mount the handle-bars of velocipedes upon an axis independent from that of the fork and to interpose a multiplying mechanism between the two axes. The object, however, in that case was different from that of the present invention, the idea being to compel the cyclist to assume an erect or vertical position of the body, as in velocipedes of the "ordinary" class having front driving-wheels. For this purpose it was necessary to place the handle-bars very close to the saddle and to mount the two axes, that of the fork and the supplementary or steering axis, at a considerable distance apart. On the contrary, however, according to this invention I retain unaltered the construction of the ordinary velocipede and the position of the cyclist upon the vehicle, and I arrange the axis of the handle-bar very close to the axis of the fork, or I may even arrange the one of these axes to engage within the other or concentric.

In the accompanying drawings I have shown by way of example some of the devices which may be adopted for carrying my invention into practice.

Figure 4:
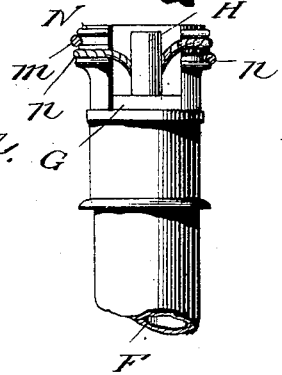
Figure 5:
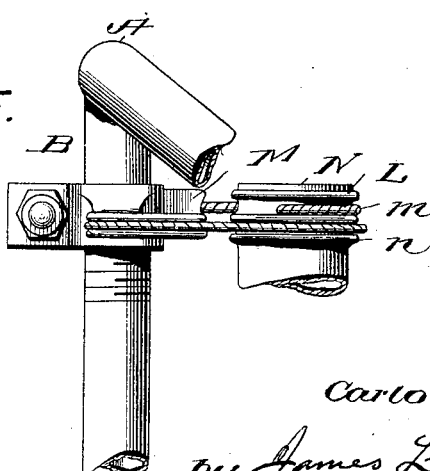

Figure 1 is a perspective view of my improved device applied to the head of a bicycle. Fig. 2 is a plan view thereof, showing the device in its central position. Fig. 3 is a similar view to Fig. 2, showing the device turned at an angle, the cap upon the socket N being removed. Fig. 4 is a front elevation of the steering-tube. Fig. 5 is a side elevation of the steering mechanism.

A is the steering or handle bar, the height of which can be adjusted in the ordinary manner; B, the steering-rod to which the handle-bar is attached, guided in the socket C.

F is the steering-tube, terminating below in the fork and guided in the socket E.

D is a clamping-piece for connecting the two sockets C and E, which may be made separate and connected together, as shown, or cast, forged, or stamped in one piece.

To the extremity of the steering-rod B is secured a symmetrical piece or lever M, which terminates in two curved arms. The steering-tube F is surmounted by a plate G, provided with a pin H. Fig. 3 shows the extent of eccentricity of the pin H relatively to the center of the plate G and of the socket N, which is open in front. In the lateral surface of the said socket are provided the grooves $m$ and $n$. Between the adjustable pins $a$ and $b$ a metal band, cord, chain, or the like is stretched, which band passes from the point $l$ on the left-hand arm of the lever M around the lower groove $n$ of the socket N to the point 2, thence to the pin H, to which it is fastened. From this pin the band or the like rises, as at 3, and passes around the upper groove $m$ to the point 4 on the right-hand arm of the lever M, where it is attached to the adjustable pin $b$.

As the band is invariably connected to the pin H, the lever M, while turning with the steering-rod B, operates the steering-tube F, the extent of the respective angles of rotation being determined by the dimensions of the several parts.

The rotation of the lever M is limited, as will be seen from the dotted lines in Fig. 2, by the meeting of one or the other of the arms of the said lever M with the walls $p$ or $q$ of the front opening of the socket. The cyclist cannot therefore turn the handle-bar as heretofore beyond a certain point, which was one of the most frequent causes of falls to cyclists.

The arrangement shown can be advantageously applied not only to bicycles, but also to tricycles, automotive vehicles, and the like.

What I claim is—

In a steering mechanism for velocipedes, the combination with the steering-rod, of a two-armed curved lever fixed thereon, the steering-tube, a head fixed thereon and having a grooved periphery, a pin eccentrically fixed on said head, and two flexible connections seated in said grooves, said flexible connection being secured intermediate its ends to said pin and attached at its ends to the ends of said two-armed lever, substantially as described.

In witness whereof I have hereunto set my hand in presence of two witnesses.

CARLO CARLONI.

Witnesses:
OTTOINO LASSAIR,
GIACOMO GUARNIERI.